United States Patent [19]

Yamashita

[11] Patent Number: 4,521,524
[45] Date of Patent: Jun. 4, 1985

[54] CONTRAST ENHANCEMENT FILTER FOR COLOR CRT DISPLAY DEVICES

[75] Inventor: Toshiharu Yamashita, Tokyo, Japan

[73] Assignee: Hoya Corporation, Tokyo, Japan

[21] Appl. No.: 420,664

[22] Filed: Sep. 21, 1982

[30] Foreign Application Priority Data

Sep. 21, 1981 [JP] Japan ................. 56-147797

[51] Int. Cl.$^3$ .............. C03C 3/04; C03C 3/10; H01J 29/86
[52] U.S. Cl. .................... 501/64; 313/480; 501/60; 501/62; 501/76; 501/78; 501/79
[58] Field of Search ........ 501/64, 60, 62, 73, 501/75, 76, 78, 79; 313/480

[56] References Cited

U.S. PATENT DOCUMENTS

| | | | |
|---|---|---|---|
| 4,288,250 | 9/1981 | Yamashita | 501/78 |
| 4,376,829 | 3/1983 | Daiku | 501/64 |
| 4,390,637 | 6/1983 | Daiku | 501/64 |
| 4,405,881 | 9/1983 | Kobayashi | 313/480 |
| 4,454,446 | 6/1984 | Kobayashi | 313/480 |

Primary Examiner—Helen M. McCarthy
Attorney, Agent, or Firm—Sughrue, Mion, Zinn, Macpeak and Seas

[57] ABSTRACT

A glass filter for contrast enhancement in a color CRT display devices comprises
100 parts by weight of a base glass comprising, in % by weight
3 to 70% $SiO_2$,
0 to 40% $B_2O_3$,
0 to 23% $Al_2O_3$,
0 to 23% $R_2O$ ($R_2O$ being at least one selected from the group consisting of $Li_2O$, $Na_2O$ and $K_2O$),
2 to 35% RO (RO being at least one selected from the group consisting of MgO, CaO, SrO, BaO, ZnO and PbO),
0 to 10% $TiO_2$,
0 to 10% $ZrO_2$,
0 to 35% $La_2O_3$ and
5 to 40% $Nd_2O_3$,
at least two coloring components selected form the group consisting of 6 parts by weight or less $CeO_2$, 1.0 parts by weight or less CuO, 3.5 parts by weight or less $MnO_2$, 0.15 parts by weight or less CoO, 3.0 parts by weight or less $Fe_2O_3$, 1.5 parts by weight or less NiO and 5.0 parts by weight or less $Pr_6O_{11}$, and
at least one coloring component selected form the group consisting of CeO, CuO, $MnO_2$ and CoO.

7 Claims, 1 Drawing Figure

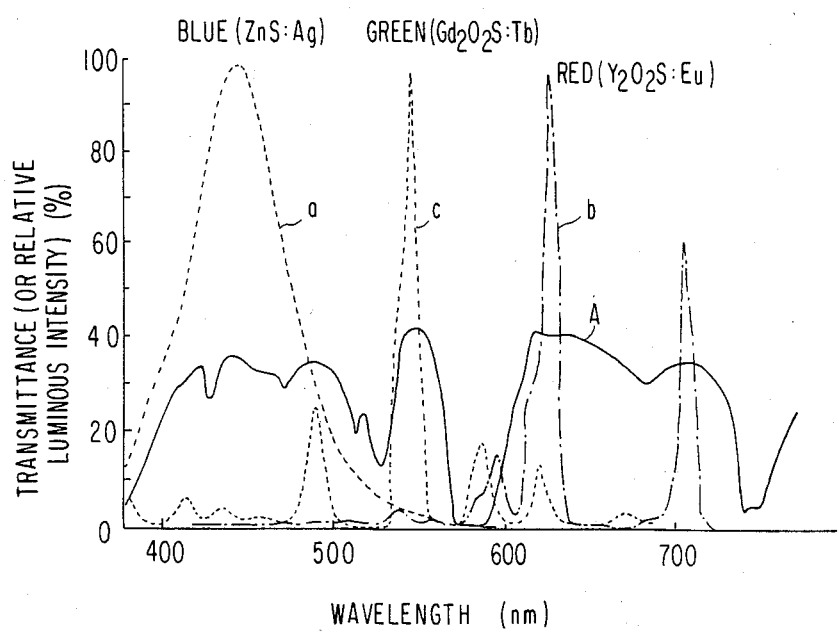

CONTRAST ENHANCEMENT FILTER FOR COLOR CRT DISPLAY DEVICES

FIELD OF THE INVENTION

The present invention relates to a contrast enhancement filter for color CRT display devices and more particularly, to a glass filter which can exhibit a high contrast effect when it is applied to a color CRT display device which is used under a bright ambient light, such as the cockpit of an aircraft.

BACKGROUND OF THE INVENTION

In observing an image on a CRT under a bright ambient light, the ratio of the intensity of light emitted from a fluorescent substance to the intensity of light reflected from the face of the fluorescent substance as the face plate decreases so that the contrast of image reduces with increasing the brightness of an ambient light. Various methods have been proposed to overcome this problem and some methods have been commercially practiced.

One of these practical methods uses a colored glass wherein the intensity of reflected light of an ambient light is reduced using a neutral density glass as the face plate or the front face filter on the plate. The lower the light transmittance of the neutral density glass, the higher the contrast of the image, but at the same time, the brightness (luminance) of the image is decreased. Thus, the neutral density glass currently used has a light transmittance of 50% or more.

Attempts have been made to minimize the decrease of the image brightness by bonding the neutral density filter or another filter, but the bonding portion tends to break by heat or mechanical shocks and the bonding interface causes undesired reflection or scattering of light.

It is known that the $Nd^{3+}$ ion in a glass has a sharp and intense light absorption at wavelengths of 530 nm and 585 nm. U.S. Pat. No. 4,288,250 discloses a contrast enhancement filter for CRT display devices composed of phosphor P-43 comprising a glass containing a relatively large amount of $Nd_2O_3$ and incorporated therein coloring components such as $Cr_2O_3$ and CuO based on the finding that the glass containing a relatively large amount of $Nd_2O_3$ has a transmission peak with a very small half-width at a wavelength near 550 nm and this peak is very close to the luminous peaks of P-43.

SUMMARY OF THE INVENTION

As a result of further studies on a contrast enhancement filter for color CRT display devices utilizing the agreement between the transmission peaks of the glass containing a relatively large amount of $Nd_2O_3$ and the luminous peaks of P-43, it has been succeeded to produce a monolithic glass filter suitable for a color CRT comprising P-22 as blue (ZnS:Ag) and red ($Y_2O_2S$:Eu) fluorescent substances and P-43 ($Gd_2O_2S$:Tb) as a green fluorescent substance.

Therefore, an object of the present invention is to provide a monolithic glass filter which can provide a high contrast image having a high luminance even under a bright ambient light. This object can be achieved by utilizing the inherent light absorption characteristics of $Nd^{3+}$ ions, the inherent functions of Ce, Mn, Co, Cu and Fe(Ni) ions to control the transmittance and hue to blue, green and red lights and characteristics of effectively absorbing light having wavelengths other than the luminous peaks of the fluorescent substance.

BRIEF DESCRIPTION OF THE DRAWING

The FIGURE shows the spectral transmission curves of the glass of Example No. 2 of the present invention and the spectral energy distribution of radiation from three color fluorescent substances.

DETAILED DESCRIPTION OF THE INVENTION

In the present invention, $CeO_2$, $MnO_2$, CoO, CuO, $Fe_2O_3$ and NiO are used as coloring components. These components have the effects to adjust the hue of the glass coloration, control the luminance of each color light emitted from fluorescent substance and absorb light having wavelengths other than the luminous peaks of the fluorescent substances. The contrast enhancement filter of the present invention can be obtained by the co-presence of at least two of these coloring components.

It is well known that a glass containing $Nd_2O_3$ has color rendering properties and shows different hue depending on the distribution of the spectral energy of light. If the $Nd_2O_3$ content is relatively small, the glass shows a magenta color under sunlight and a blue color under a fluorescent lamp. On the other hand, the filter glass containing at least 5 wt% of $Nd_2O_3$ of the present invention has a very strong absorption of the green light region and, as a result, the magenta color predominates even under a fluorescent lamp. To display exactly the hue developed by emission from the respective fluorescent substances, the filter glass must be neutral. However, the glass containing at least 5 wt% of $Nd_2O_3$ shows a magenta color as described above and an neutral density filter glass cannot be obtained by simply neutral density filters or introducing a single coloring component. To render the hue of glass neutral, the transmittance of blue and red lights must be decreased in the degree corresponding to the amount of green light reduced by the presence of $Nd^{3+}$ ion. By minimizing the reduction of the transmittance at the neighborhood of the luminous peak of each fluorescent substance while absorbing the light having other wavelengths so as to balance the amounts of the lights of the three colors, a high contrast, neutral density glass filter having a high luminance can be obtained.

$CeO_2$ has an absorption at the visible short wavelength region and is effective to reduce the blue light having a wavelength shorter than the luminous peak of the blue light emitted from fluorescent substance.

CuO has an absorption at mainly the visible long wavelength region and is effective to reduce the red light having a wavelength longer than the luminous peak of the red light emitted from fluorescent substance.

$MnO_2$ and CoO are effective to reduce the transmittance of the light at the wavelength region between blue and green lights and also the light at the wavelength region between green and red lights and are necessary to control the luminance of green light.

$Fe_2O_3$ has an effect to absorb lights at both the visible short wavelength and long wavelength regions.

NiO is effective to reduce the transmittance of the blue light region.

A contrast enhancement filter for color CRT displays is also required to have the function of controlling the relative luminance of the lights of the three colors to match the luminance and spectral luminous sensitivity of each fluorescent substance. $Nd_2O_3$ does not have the hue controlling function and the relative luminance controlling function and the glass filter according to the present invention cannot be obtained without the co-presence of the coloring components described above. The spectral transmittance characteristics of the $Nd_2O_3$-colored glass are not almost affected by the base glass composition, but the spectral transmittance characteristics and absorption intensity of a glass containing these coloring components are affected by the base glass composition.

Therefore, the contrast enhancement filter for color CRT displays according to the present invention is obtained by studying the behaviors on light absorption characteristics of various coloring components in a glass containing at least 5 wt% of $Nd_2O_3$, selecting coloring components suitable for the base glass composition, and specifying the amounts of the respective coloring components.

The filter glass of the present invention comprising 100 parts by weight of a base glass comprising 3 to 70% by weight of $SiO_2$,
0 to 40% by weight of $B_2O_3$,
0 to 23% by weight of $Al_2O_3$,
0 to 23% by weight of $R_2O$ ($R_2O$ being at least one of $Li_2O$, $Na_2O$ and $K_2O$),
2 to 35% by weight of RO (RO being at least one of MgO, CaO, SrO, BaO, ZnO and PbO),
0 to 10% by weight of $TiO_2$,
0 to 10% by weight of $ZrO_2$,
0 to 35% by weight of $La_2O_3$ and
5 to 40% by weight of $Nd_2O_3$, at least two coloring components selected from the group consisting of 6% by weight or less of $CeO_2$, 1.0% by weight or less of CuO, 3.5% by weight or less of $MnO_2$, 0.15% by weight or less of CoO, 3.0% by weight or less of $Fe_2O_3$, 1.5% by weight or less of NiO and 5.0% by weight or less of $Pr_6O_{11}$, and at least one coloring component selected from the group consisting of $CeO_2$, CuO, $MnO_2$ and CoO.

The reasons for limiting the amounts of each of these components are described hereinafter. If $SiO_2$ in the base glass is more than 70% by weight, it becomes difficult to vitrify because the viscosity of the glass is too high so that $SiO_2$ is difficult to dissolve therein and the solubility of $Nd_2O_3$ is too low. If $SiO_2$ is less than 3% by weight, vitrification occurs only if a comparatively large amount of $B_2O_3$ is present and chemical durability under use is not obtained.

$B_2O_3$ is a glass modifier which is a replacement of $SiO_2$ and serves to increase the solubility of $Nd_2O_3$. $B_2O_3$ can be added in an amount of up to 40% by weight. If $B_2O_3$ is more than 40% by weight, the chemical durability of the glass becomes poor. $B_2O_3$ is an effective component where CoO coloration is utilized to control the amount of green light.

$Al_2O_3$ is effective to not only improve the chemical durability and mechanical strength of glass but also enhance the light absorption. However, if $Al_2O_3$ is more than 23% by weight, the melting of the glass becomes difficult.

$R_2O$ improves the meltability of glass, but if it is more than 23% by weight, the chemical durability of the glass becomes poor.

RO is necessary to produce a glass which can satisfy various properties such as strength, hardness and chemical durability required for a practical glass and is used in amount of 2% by weight or more. On the other hand, if RO is more than 35% by weight, the chemical durability rather becomes poor.

$TiO_2$ has strong absorption in the ultraviolet region, enhances the coloring of $CeO_2$ and contributes to absorb lights in the visible short wavelength region and control the amount of blue light, but if $TiO_2$ is more than 10% by weight, the glass is easily devitrified.

$ZrO_2$ is effective to increase the chemical durability and hardness of glass, but if more than 10% by weight, the glass is easily devitrified.

$La_2O_3$ is not a coloring component but since its properties are very similar to those of $Nd_2O_3$, it can be used in an amount of up to 35% by weight in place of $Nd_2O_3$ to increase the chemical durability and hardness of glass.

If $La_2O_3$ is more than 35% by weight, the glass is easily devitrified.

$Nb_2O_5$ and $Ta_2O_5$ may be added to increase the chemical durability and hardness of glass, but these components are very expensive and need not be used in an amount more than 5% by weight.

$Nd_2O_3$ is an essential component having an effect of separating blue, green and red lights from the fluorescent substances and must be added in an amount equal to or greater than 5% by weight to achieve its effects. However, if more than 40% by weight, no increased effect is obtained and the glass is easily devitrified.

$CeO_2$ absorbs light in the visible short wavelength region and is used to control the light absorption of the region and the transmittance of blue light. The effects of $CeO_2$ are satisfactorily achieved when it is used in an amount of 6% by weight or less per 100 parts by weight of the base glass. The preferable amount of $CeO_2$ is 0.5 to 6.0% by weight.

CuO absorbs light in the visible long wavelength region and is effective to control the light absorption in the region and the transmittance of red light. If CuO is more than 1.0% by weight, the glass is colored too much so that the transmittance of red light is reduced too much. The preferable amount of CuO is 0.01 to 0.5% by weight.

$Fe_2O_3$ absorbs light in both long and short wavelength regions in the visible light and is used to control the transmittance of blue and red lights. If it is more than 3.0% by weight, the color density of glass is too large.

$MnO_2$ absorbs light having a wavelength between blue and green lights and CoO absorbs light of a wavelength between green and red lights. These components are effective to reduce the transmittance of green light. Excessive coloration occurs if $MnO_2$ is more than 3.5% by weight and if CoO is more than 0.15% by weight. Further, the desired effect is not achieved if $MnO_2$ is less than 0.1% by weight and CoO is less than 0.001% by weight.

NiO has strong absorption in the blue light region and is effective to control the transmittance of blue light, but its absorption wavelength is so close to the luminous peak of blue light emitted from a fluorescent substance that a large amount thereof cannot be added to the glass. However, in a contrast enhancement filter for a color CRT display in which display is accomplished in green and red lights, NiO is effective as a component of absorbing blue light by adding up to 1.5% by weight.

$Pr_6O_{11}$ absorbs blue light and light having wavelengths between about 580 and about 590 nm. Therefore, $Pr_6O_{11}$ is effective to decrease the intensity of blue light and separate green and red lights. If $Pr_6O_{11}$ exceeds 5% by weight, the transmittance of blue light region is decreased.

$As_2O_3$ and $Sb_2O_3$ are added as refining agents as in conventional glass.

In the following, examples of the present invention are shown. Each component in the base glass is shown as % by weight and the amounts of $CeO_2$, CuO, $MnO_2$, CoO, $Fe_2O_3$, NiO, $Pr_6O_{11}$, $As_2O_3$ and $Sb_2O_3$ are in parts by weight per 100 parts by weight base glass.

| Component | 1 | 2 | 3 | 4 | 5 | 6 | 7 | 8 | 9 | 10 | 11 | 12 |
|---|---|---|---|---|---|---|---|---|---|---|---|---|
| $SiO_2$ | 67.0 | 60.0 | 5.0 | 5.0 | 5.9 | 5.2 | 55.9 | 45.3 | 63.7 | 22.5 | 3.0 | 5.0 |
| MgO | — | — | 3.0 | 3.0 | — | — | — | — | — | — | — | — |
| CaO | 3.0 | 3.5 | 6.6 | 6.6 | 9.6 | — | — | — | 2.1 | — | — | 9.6 |
| SrO | — | — | — | — | — | 0.3 | — | — | — | — | — | — |
| BaO | — | — | — | — | — | — | — | — | — | 35.0 | — | — |
| ZnO | — | — | 13.4 | 13.4 | 13.4 | 5.0 | 3.8 | — | 5.2 | 4.0 | 25.0 | 13.4 |
| PbO | — | 9.8 | — | — | — | 20.2 | — | 27.6 | — | — | — | — |
| $Nd_2O_3$ | 10.0 | 9.0 | 32.9 | 32.9 | 7.0 | 15.6 | 8.9 | 8.8 | 10.0 | 21.8 | 37.2 | 22.9 |
| $Li_2O$ | — | — | — | — | — | 1.4 | — | — | 4.3 | — | — | — |
| $Na_2O$ | 20.0 | 12.8 | — | — | — | — | 1.8 | — | 8.4 | — | — | — |
| $K_2O$ | — | 2.7 | — | — | — | 0.2 | 11.9 | 15.6 | — | — | — | — |
| $B_2O_3$ | — | — | 37.1 | 37.1 | 37.1 | 28.1 | 16.3 | — | 2.6 | 5.7 | 30.6 | 37.1 |
| $Al_2O_3$ | — | — | 2.0 | 2.0 | 2.0 | 20.7 | 1.4 | 2.7 | 3.7 | — | — | 2.0 |
| $La_2O_3$ | — | — | — | — | 25.0 | — | — | — | — | $Nb_2O_5$ | $Ta_2O_5$ | 5.0 |
| $TiO_2$ | — | 2.2 | — | — | — | 0.8 | — | — | — | — | — | — |
| $ZrO_2$ | — | — | — | — | — | 2.5 | — | — | — | 6.0 | 3.5 | — |
| Total | 100.0 | 100.0 | 100.0 | 100.0 | 100.0 | 100.0 | 100.0 | 100.0 | 100.0 | 100.0 | 100.0 | 100.0 |
| $CeO_2$ | 4.0 | 2.7 | 4.5 | 4.0 | 2.0 | — | — | 5.0 | 3.0 | 3.0 | 4.0 | 4.5 |
| CuO | 0.3 | 0.18 | 0.15 | — | 0.05 | 0.1 | — | 0.2 | 0.05 | 0.05 | 0.13 | 0.17 |
| $MnO_2$ | 3.0 | 1.5 | — | — | — | 0.5 | — | 1.0 | 0.7 | 0.5 | — | — |
| CoO | — | — | — | 0.11 | 0.05 | 0.02 | 0.008 | — | 0.005 | 0.04 | — | — |
| $Fe_2O_3$ | — | — | — | — | — | — | 1.6 | — | — | — | — | — |
| NiO | — | — | — | — | — | — | — | — | — | — | — | 1.0 |
| $Pr_6O_{11}$ | — | — | — | — | 1.0 | — | — | — | — | — | — | — |
| $As_2O_3$ | 0.2 | 0.2 | — | — | — | 0.2 | 0.2 | 0.2 | 0.3 | 0.2 | — | — |
| $Sb_2O_3$ | — | — | 0.05 | 0.05 | 0.05 | — | — | — | 0.1 | — | — | 0.05 |

The glasses having the compositions shown above according to the present invention were prepared by mixing conventional glass raw materials such as oxides, carbonates, nitrates and hydroxides, melting the raw materials at 1300° to 1450° C. in a ceramic or platinum crucible or tank, stirring, refining and homogenizing the melts, casting the melts into a mold and gradually cooling.

All glasses were made of a monolithic glass plate, not a laminated structure.

The FIGURE shows the luminous spectral for the three fluorescent substances (indicated by curves a, b and c) in relation to the spectral transmittance (indicated by curve A) of the filter glass (Example No. 2) of the present invention in a glass thickness of 2.5 mm. As shown in the FIGURE, the fluorescent substances have high values of transmittance at wavelengths near their respective luminous peaks and the light at other wavelengths is effectively absorbed. Therefore, by using the filter glass of the present invention, the ratio of image luminance to the intensity of the light reflected from the face plate of a CRT can be made lower than that offered by the conventional neutral density filter and an image of a relatively high luminance and high contrast can be seen on the CRT.

The spectral transmission curve of glass No. 2 is shown in the FIGURE as the representative example. As is apparent from the FIGURE, the glass can separate blue, green and red lights sufficiently and the wavelength of each transmission peak consists with that of the luminous peak of the respective fluorescent substances. Therefore, the glass has the effect of achieving a high contrast without a substantial decrease of luminance. Furthermore, the hue of the glass is gray or near-gray, the filter glass of the present invention can exactly reproduce the display colors.

Due to these characteristics, when the filter glass of the present invention is used as a front panel or face plate of a color CRT display devices, a sharp image having good color reproducibility can be obtained and a high contrast image can be maintained in a very bright area. Therefore, the filter glass can be used most effectively as a contrast enhancement filter for color CRT display devices disposed in the cockpit of an aircraft.

While the invention has been described in detail and with reference to specific embodiment thereof, it will be apparent to one skilled in the art that various changes and modifications can be made therein without departing from the spirit and scope thereof.

What is claimed is:

1. A glass filter for contrast enhancement in color CRT display devices consisting essentially of
   100 parts by weight of a base glass consisting essentially of, in % by weight
   3 to 70% $SiO_2$,
   0 to 40% $B_2O_3$,
   0 to 23% $Al_2O_3$
   0 to 23% $R_2O$ ($R_2O$ being at least one component selected from the group consisting of $Li_2O$, $Na_2O$ and $K_2O$),
   2 to 35% RO (RO being at least one component selected from the group consisting of MgO, CaO, SrO, BaO, ZnO and PbO),
   0 to 10% $TiO_2$,
   0 to 10% $ZrO_2$,
   0 to 35% $La_2O_3$ and
   5 to 40% $Nd_2O_3$,
   0.01 to 1.0 parts by weight of CuO, and
   at least one coloring component selected from the group consisting of 6 parts by weight or less $CeO_2$, 3.5 parts by weight or less $MnO_2$, 0.15 parts by weight or less CoO, 3.0 parts by weight or less $Fe_2O_3$, 1.5 parts by weight or less NiO and 5.0 parts by weight or less $Pr_6O_{11}$.

2. The glass filter of claim 1, wherein the amount of $CeO_2$ is 0.5 to 6.0 parts by weight.

3. The glass filter of claim 1, wherein the amount of $MnO_2$ is 0.1 to 3.5 parts by weight.

4. The glass filter of claim 1, wherein the amount of CoO is 0.001 to 0.15 parts by weight.

5. The glass filter of claim 1, wherein the amount of CuO is 0.01 to 0.5 parts by weight.

6. The glass filter of claim 1, wherein the spectral transmittance at the points of highest transmittance is less than about 40%.

7. The glass filter of claim 1, wherein said glass has a gray or near-gray hue.

* * * * *